FIG.2

Nov. 15, 1960  H. B. ALBERS  2,959,840
APPARATUS FOR FORGING CRANKSHAFTS
Filed Feb. 21, 1955  11 Sheets-Sheet 4

Nov. 15, 1960  H. B. ALBERS  2,959,840
APPARATUS FOR FORGING CRANKSHAFTS
Filed Feb. 21, 1955  11 Sheets-Sheet 10

United States Patent Office 2,959,840
Patented Nov. 15, 1960

2,959,840

APPARATUS FOR FORGING CRANKSHAFTS

Heinrich B. Albers, Malverne, N.Y., assignor, by mesne assignments, to Baldwin-Lima-Hamilton Corporation, Philadelphia, Pa., a corporation of Pennsylvania Filed Feb. 21, 1955, Ser. No. 489,428

5 Claims. (Cl. 29—6)

This invention relates to the manufacture of crankshafts or similar articles having any desired number of offset elements such as crank arms or throws positioned at any desired angle relative to one another. It is particularly adapted to the manufacture of large crankshafts such as are used in locomotive and ship diesel engines. The method heretofore most frequently employed consisted in forging the entire crankshaft flat with all cranks located in the same plane, and then twisting the respective cranks angularly to their final positions. This method required the use of excessively large dies and forging pressures, and resulted in setting up undesirable stresses and strains in the material.

Other methods have been proposed but they also required excessively large forging pressures or did not provide for forming the elements of the crankshaft close to the dimensions of the finished parts. Furthermore, there was no provision for ready adjustment of a forging machine to vary the relative angular position of the cranks to be formed.

It is therefore an object of this invention to provide an improved forging apparatus for forming crankshafts, which will employ relatively low forging pressures with correspondingly small forging equipment.

It s a further object to provide a forging apparatus which can be operated to perform a succession of operations in a minimum time so that the entire crankshaft can be forged in a small number of heats, or even in a single heat in the case of a crankshaft or limited size.

It is another object of this invention to provide a forging system for the successive elements of a crankshaft which employs means for forming the elements close to the dimensions of the finished parts so that a minimum of machining is required for completion.

Still another object of this invention is the provision of apparatus for positioning the cranks at any desired relative angles without twisting of the material.

Further objects and advantages of this invention will become apparent in the following detailed description thereof.

In the accompanying drawings,

Figs. 6 to 14 are a series of plan views, partly sectioned and partly diagrammatic, showing certain of the parts of Figs. 1 to 5, and illustrating the sequence of operations in forming a crankshaft. In Figs. 6 and 11 the dies are shown in open position.

Figure 13:
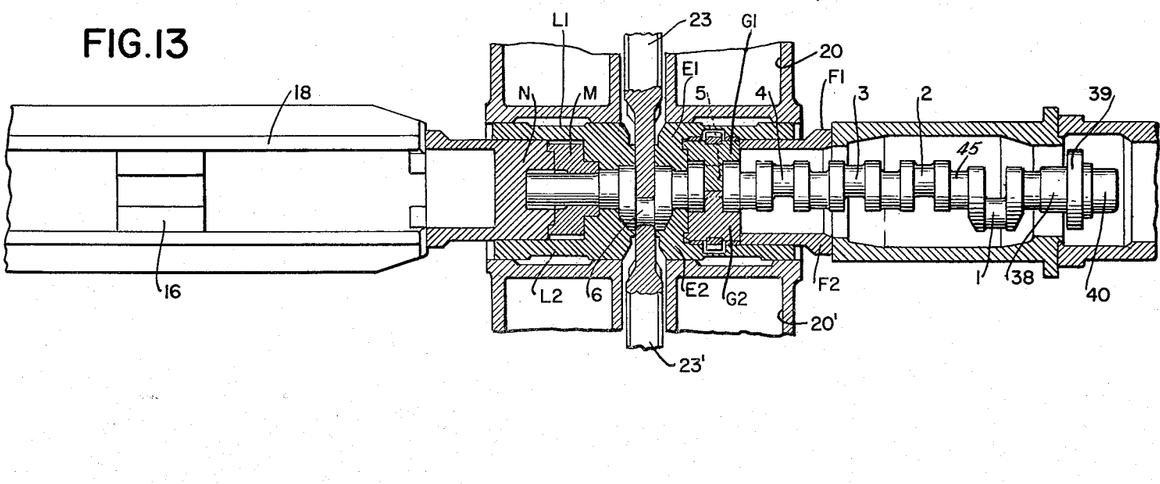
Figure 14:
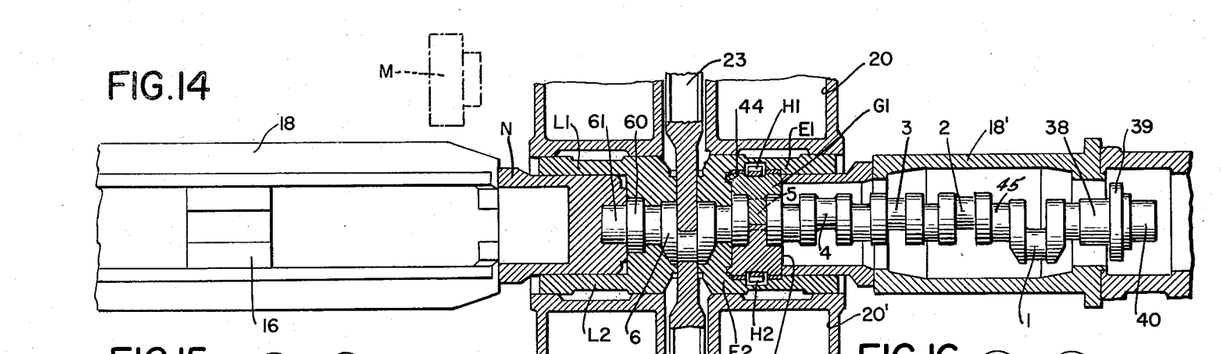

For the purpose of illustrating the system and apparatus constituting this invention, they are shown in connection with the forming of a crankshaft (see Figs. 13 and 14) having six throws, a flange and test piece at one end, and a collar and test piece at the other end. However, it will readily be apparent that the invention is applicable to the forming of a wide variety of crankshafts.

The apparatus comprises essentially two double-acting forging presses arranged preferably in a single horizontal plane at right angles to each other so as to facilitate the loading and unloading of the machine. One of the presses consists of the press or press sections 10, 10' and is utilized primarily for upsetting of the metal to be formed, while the other press or press sections 11, 11' perform the function of offsetting the metal and forging it in closed dies. In the embodiment shown, the offsetting press 11, 11' is arranged between the two sections 10, 10' of the upsetting press, the horizontal axes of both presses 10, 10' and 11, 11' being disposed in the same single plane. It should also be noted that the press sections 11, 11' are opposed, one to the other, on opposite sides of the common horizontal axis through the press sections 10, 10' and at a place midway of the latter press sections.

The upsetting press sections 10, 10' are connected by columns 12 and include a pair of cylinders 15 and a cylinder 15' for operating rams or slides 18, 18' toward the upsetting and offsetting region. Return cylinders 17, 17' serve for the return movement. The rams 18, 18' are of horseshoe shape and open at their tops to permit the loading and unloading of bar stock in a substantially vertical direct'on. A support 16 (see Fig. 2) may be provided for the bar stock in the opening of ram 18.

Figure 5:
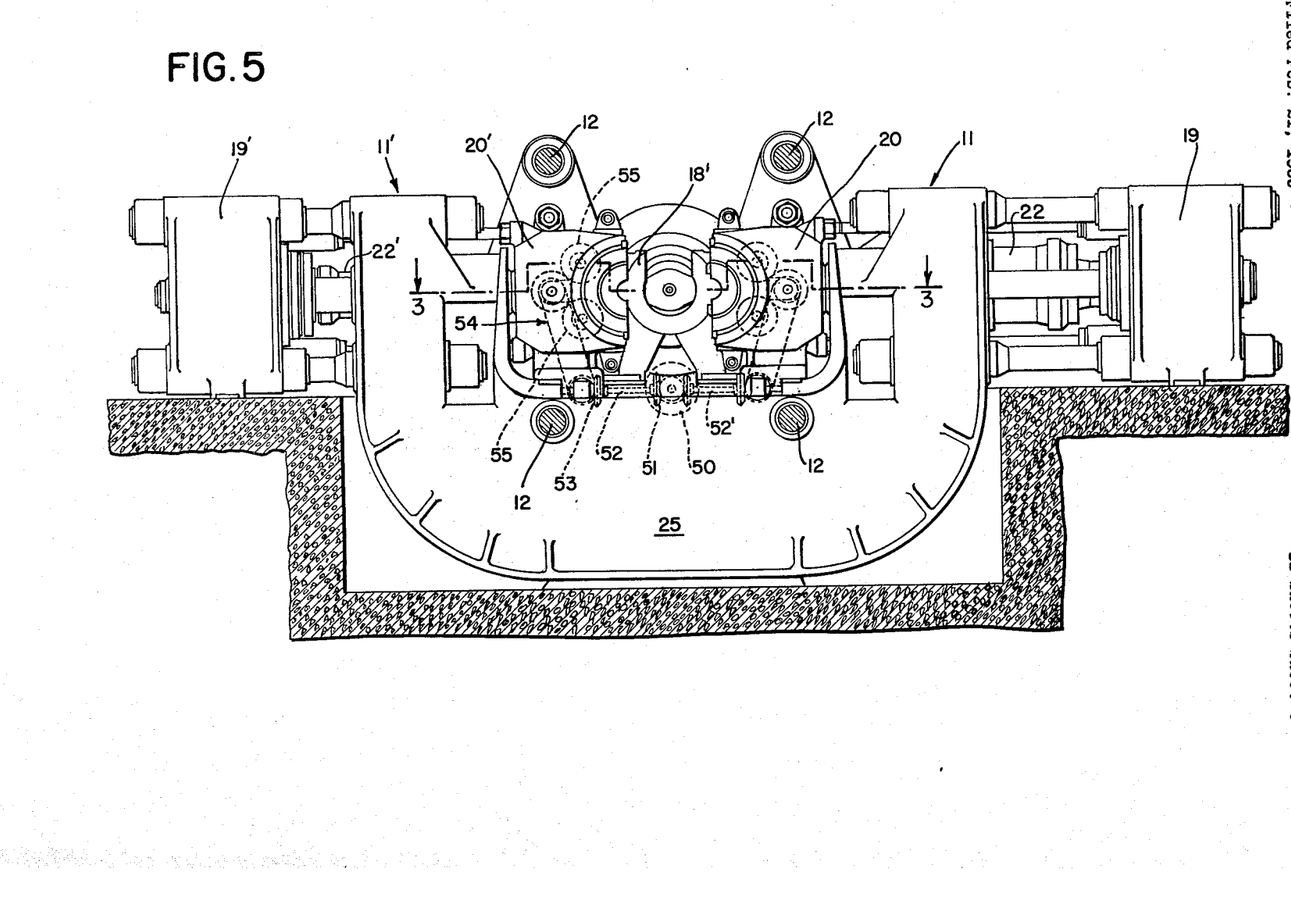
Fig. 5 is a section taken on the line 5—5 of Fig. 1.

Referring to the offsetting press sections 11, 11' between the upsetting sections 10, 10', each comprises a pair of cylinders 19 and 19' and return cylinders 21, 21' for operating crossheads 20, 20' to open and closed positions. The crossheads 20, 20' are movable relative to a fixed C-shaped frame 25 (Fig. 5) open at the top, which will also facilitate insertion and removal of bar stock in a substantially vertical direction. Within said crossheads 20, 20' are housed die halves which are moved by the movement of the crossheads, into and out of engagement with the shaft to be forged. Each offsetting press section 11, 11' also includes a cylinder 22, 22' with suitable return means to operate in opposite directions the offsetting rams 23, 23' (see Fig. 3) for pressing upset metal into the dies. Cylinder 22 is larger than cylinder 22' so that ram 23 may overcome the force developed by ram 23' as described hereinafter.

Figure 6:
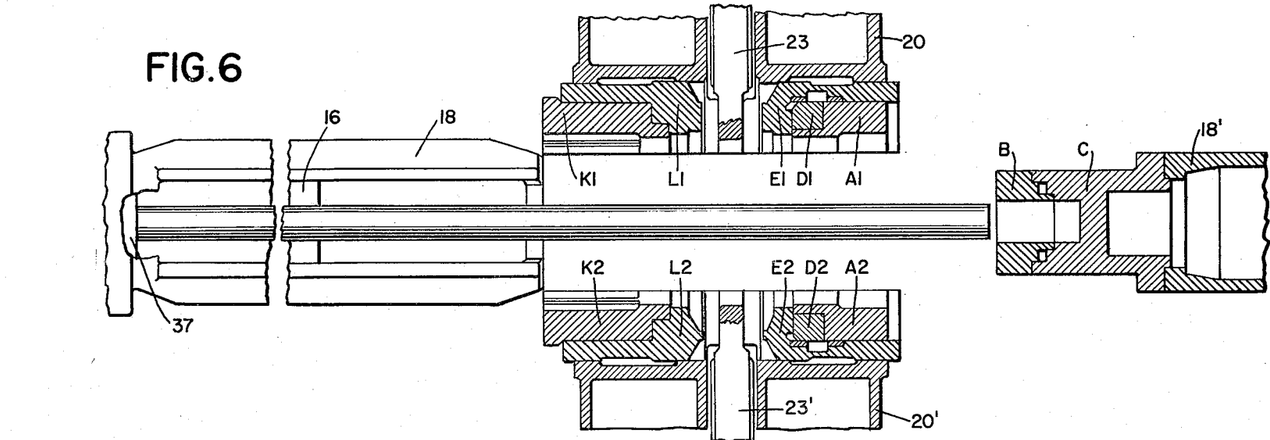
Figure 15:
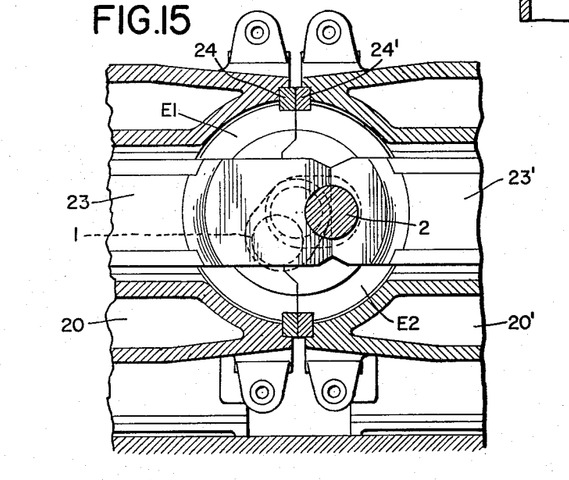
Fig. 15 is an enlarged section taken approximately on the line 15—15 of Fig. 12.
Figure 16:
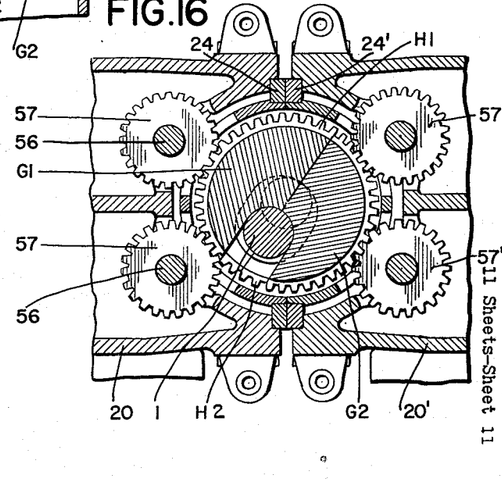
Fig. 16 is an enlarged section taken on the line 16—16 of Fig. 12 and disclosing the mechanism for effecting relative angular positioning of the cranks.

Referring to Fig. 6, the sequence of operations and the additional mechanism for performing them will now be described. The heated bar stock to be forged is lowered vertically into position in the ram or slide 18 while the crossheads 20, 20' hold the die sections apart, and the rams 18, 18' and 23, 23' are in withdrawn position. Within the left hand die sections of cross-heads 20, 20' are positioned die parts K1, K2, L1, L2, while within the right hand die sections are positioned die parts E1, E2, D1, D2, A1, A2. To maintain the dies E1, E2, and L1, L2 in their holders, while permitting sliding axial movement when the die sections are moved apart, keys 24, 24' (see Figs. 15 and 16) fixed by means such as screws (not shown) to the crossheads 20, 20' may be provided. To maintain the dies A1, A2, and K1, K2 in their holders, similar keys (not shown) fixed to the dies E1, E2, L1, L2 are provided.

When the crossheads 20, 20' are moved to closed position, die parts K1, K2 and A1, A2 will approach the bar stock closely adjacent the offsetting region and after upsetting has started, will transmit the upsetting force from ram slides 18, 18' to the bar at the points of contact as set forth hereinafter. Thus the full upsetting force is applied substantially adjacent the region where offsetting is to take place. Offsetting rams 23, 23' are moved into contact with the bar stock by means of cylinders 22, 22' at the same time the crossheads 20, 20' are closed.

With the dies in closed position, and the rams 23, 23' in engagement with the bar stock, the ram 18' carrying circular dies B and C is moved toward the offsetting dies. Simultaneously, ram 18 is moved toward the offsetting dies.

Figures 1, 1A:
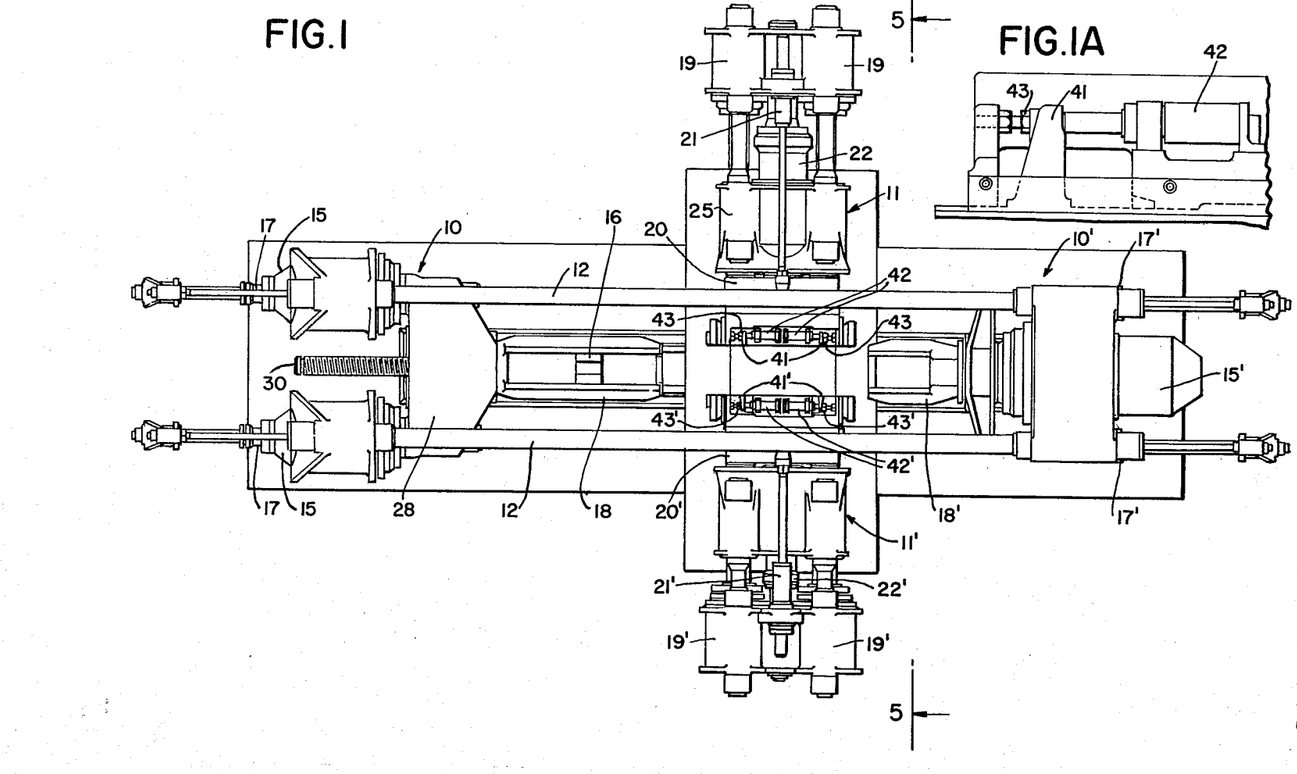
Fig. 1 is a plan view of a crankshaft forging machine embodying one form of this invention.
Fig. 1A is an enlarged plan view showing a detail of Fig. 1.
Figure 1B:
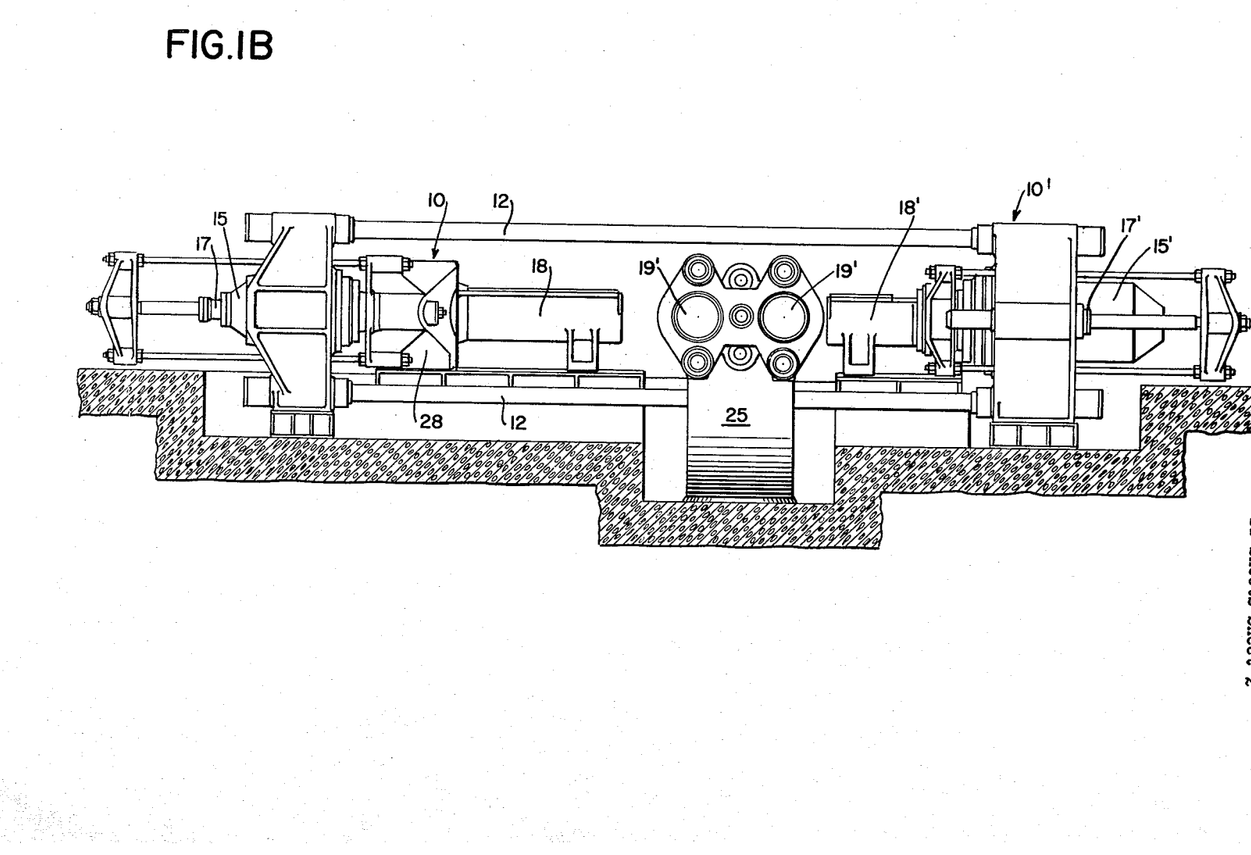
Fig. 1B is a front elevation of the Fig. 1 machine.
Figure 2:
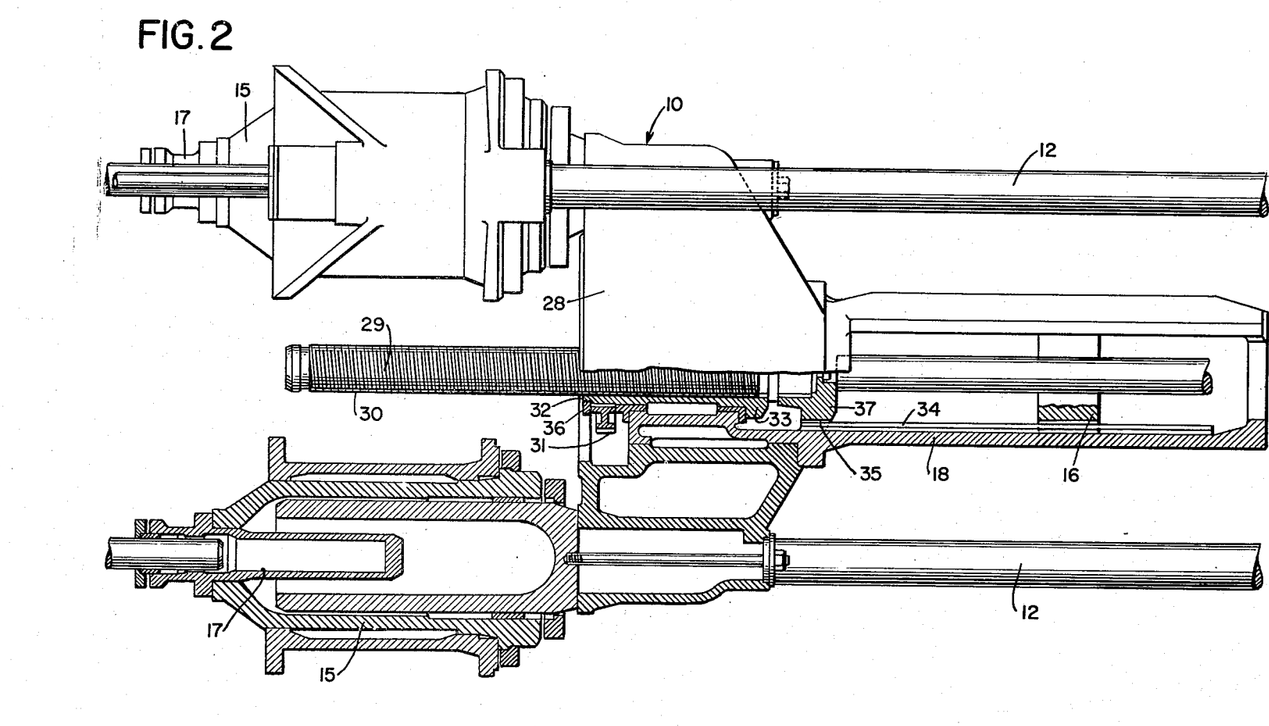
Fig. 2 is an enlarged plan view, partly sectioned, of the left hand upsetting press of Fig. 1.

The position of the bar stock wtih respect to ram 18 is determined by a pusher or spindle 30 which, as shown in Figs. 1 and 2, extends through movable crosshead 28 and into ram 18 and may be moved relative thereto by means such as a motor and pinion (not shown) engaging a gear 31 which is fixed to a bushing 32 by means of a key and a ring nut 36. Bushing 32 is held against axial movement relative to ram 18 with the aid of a collar 33, as well as the hub of gear 31. The bushing has an internal spiral thread which meshes with a spiral thread 29 on the spindle. Rotary movement of bushing 32 causes axial movement of the spindle as rotary movement of the spindle is prevented by means of a key 34 engaging in a slot 35 in spindle head 37. The spindle is thus fed toward the right to engage the left end of the bar stock to properly position it with respect to the offsetting rams where the first crank is to be formed.

To move dies E1, E2 and L1, L2 to their starting positions, a pair of cylinder and piston assemblies 42 (Figs. 1 and 1A) are mounted on movable crosshead 20, and another pair 42' are mounted on crosshead 20' so as to engage arms 41, 41' of the dies and move the same against adjustable stops 43, 43'. By setting the stops, the starting position and stroke of the upsetting dies can be determined precisely so that bar stock material trapped in the forging area will just be sufficient to fill the die cavity without causing appreciable excess material to be extruded from the dies.

*Forming crank No. 1*

Figure 7:
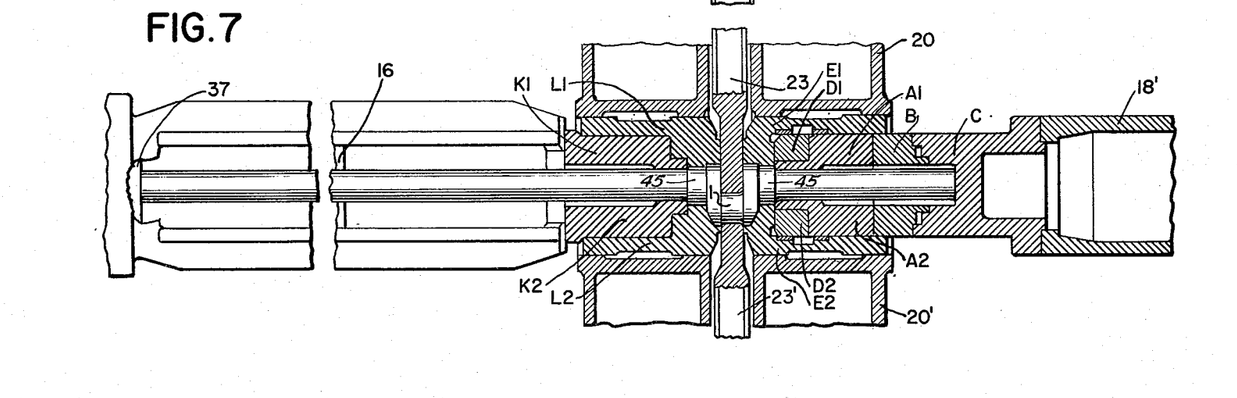

The die halves are closed by means of cylinders 19, 19' and these cylinders are placed under operating pressure. Cylinders 15, 15' are also placed under operating pressure, overcoming the force of the small cylinders 42, 42'. The upsetting forces exerted by rams 18, 18' will be transmitted initially to the ends of the bar stock through the pusher or spindle 30 and the inner end of die C. As soon as the bar stock starts to expand, it will firmly bear against the closely fitting necks of split dies A1, A2, K1, K2 and the upsetting forces will now be transmitted to the stock through said necks of said dies. Friction between the necks and the stock will prevent upsetting from taking place outside the predetermined region. The ends of the bar stock remain in contact with the head 37 of spindle 30 and the inner end of die C, respectively, and, therefore, are maintained against any movement in directions opposite to the directions of proximate upsetting forces. Thus the stock material will be caused to flow into the cavities between split dies E1, E2, L1, L2 as will be clear from Fig. 7. This step includes the formation of upset journal portions 45. No gathering of material or formation of shoulders on the stock is required prior to the forging operation since the means engaging the ends of the bar in cooperation with the dies facilitate starting from straight bar stock. As simultaneously with cylinders 15, 15' the cylinders 22, 22' are placed under operating pressure and rams 23, 23', having their ends shaped to form the crank pins, are moved together, a portion of the metal of the stock is offset in the space intermediate the dies E1, E2, L1, L2, which dies together with rams 23, 23' define the contour of a crank throw. Since ram 23 develops a force greater than that developed by ram 23', it continues its forward movement until the inside half of the crank pin is formed. The weaker ram 23', after an initial advance, is thus pushed back by the pressure of ram 23 by the amount of prescribed offset for the crankshaft, at the same time forming the outer half of the crank pin. Crank No. 1 has thus been formed (Fig. 7).

*Forming hub, flange and test piece*

Figure 8:
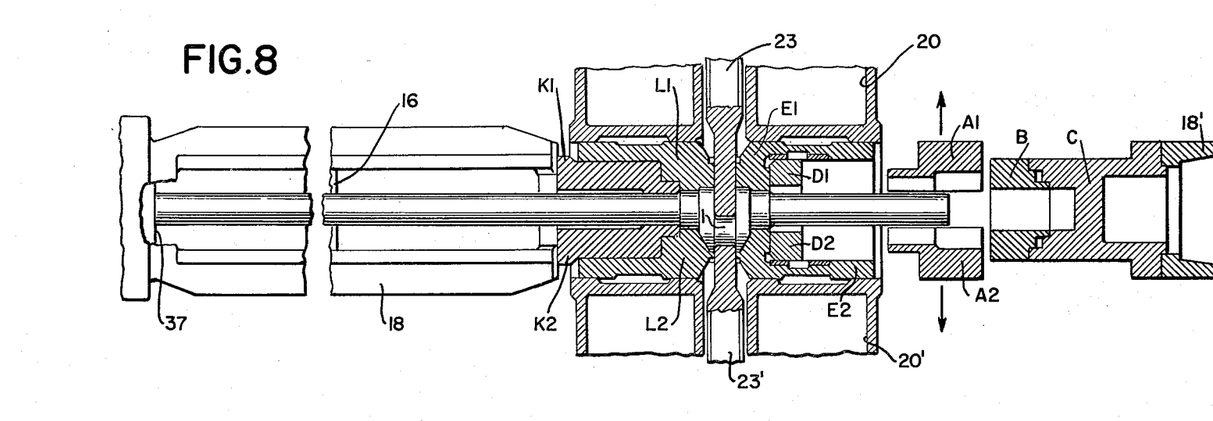

The initial positioning of the stock as determined by spindle 30, 37 provided sufficient material within dies A1, A2, B and C for forming a hub, flange and end or test piece. To adjust the dies for forging these portions, pressure on rams 18, 18' is relaxed and the ram 18' withdrawn the required distance while ram 18 may remain in its previous position (see Fig. 8). Pressure on crossheads 20, 20' is maintained to hold the stock securely located, and the accuracy of subsequent forming operations with relation to crank No. 1 is thus assured. The spacer dies A1, A2 are removed.

Figure 9:
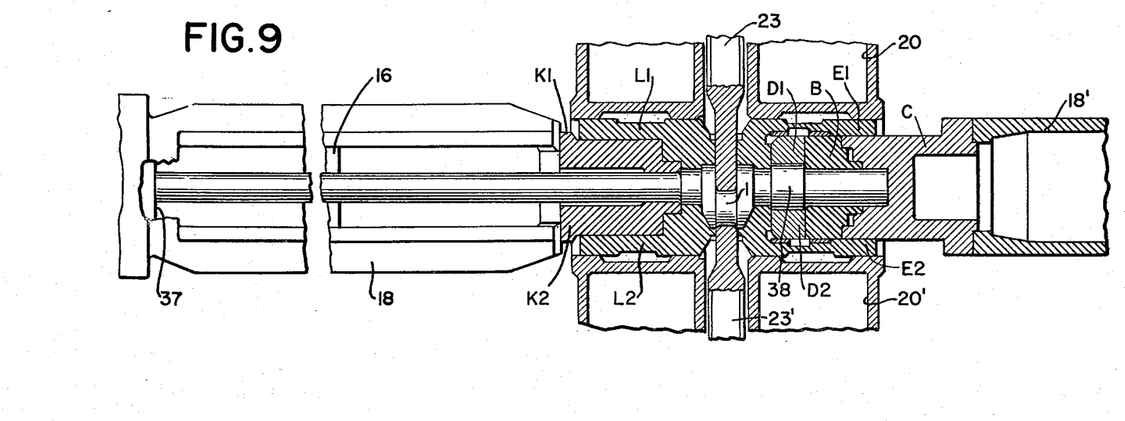

The withdrawn ram 18' is advanced and both rams are then placed under operating pressure. Ram 18', carrying dies B and C of the remaining dies, advances under presssure until die B contacts dies D1 and D2. Ram 18 stands under pressure to balance the force applied by ram 18'. In this way, hub 38 of the flange is formed (see Fig. 9) and the adjacent end of the bar stock upset to fill the inner bore of dies B and C. Preferably, the diameter of the inner bore of dies B and C corresponds to the diameter of test piece 40 to be forged (see Fig. 10).

Figure 10:
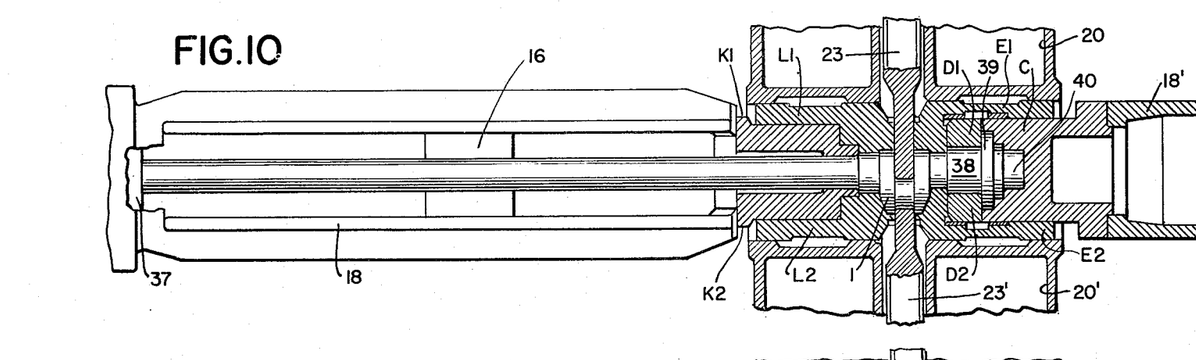

Pressure on rams 18, 18' is relieved, ram 18' is withdrawn while ram 18 may remain in its previous position, and circular spacer die B is removed. Ram 18' is advanced and both rams are then placed under pressure to form flange 39 with the end or test piece 40 thereon as shown in Fig. 10.

It will be clear that all tool changes hereinbefore described are accomplished simply by removal of dies without inserting other dies. This reduces time losses and assists greatly in forming crank No. 1, hub 38, flange 39 and test piece 40 in the same heat.

*Forming crank No. 2*

Rams 18, 18' are withdrawn and crossheads 20, 20' moved apart. Cylinders and pistons 42, 42' will automatically return the die assemblies to starting positions whereupon circular die C is removed. The bar stock is lifted out of the dies and reheated if required.

Figure 11:
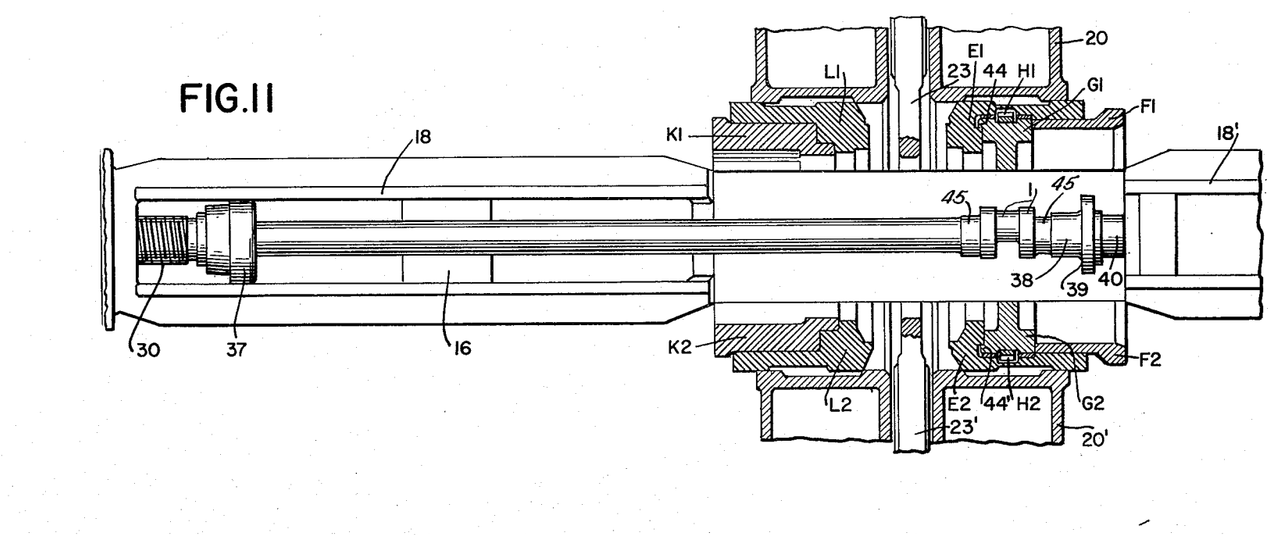
Figure 12:
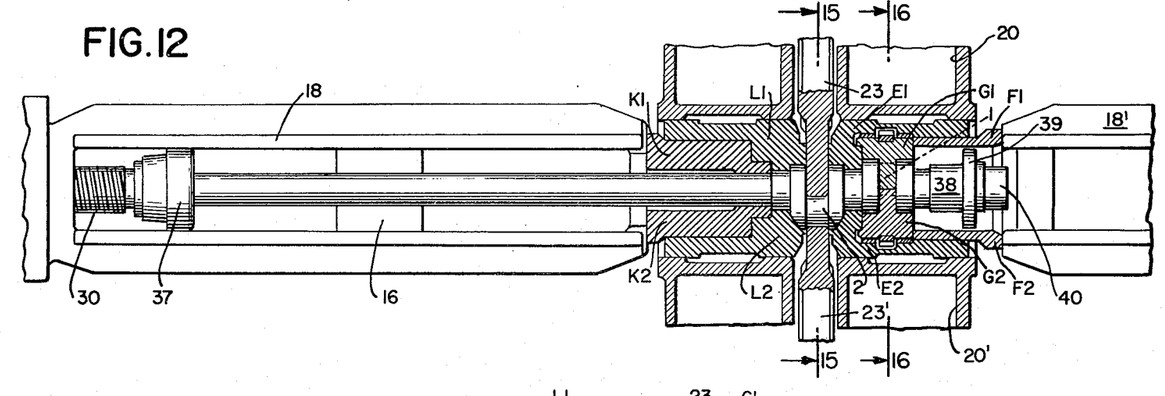

Die halves D1 and D2 are removed from inside die halves E1 and E2. Split die halves G1 and G2 (see Figs. 3 and 11), preassembled with gear segments H1 and H2, are placed in proper position inside die halves E1 and E2. The dies G1, G2 have shoulders 44, 44' engaging in circular grooves in dies E1, E2 so that the dies G1, G2 may be turned relative to dies E1, E2. Dies G1 and G2 together form a holding die to hold a crank already formed and lock it in the required angular position relative to a new crank about to be forged (see Figs. 11, 12 and 16).

Figure 3:
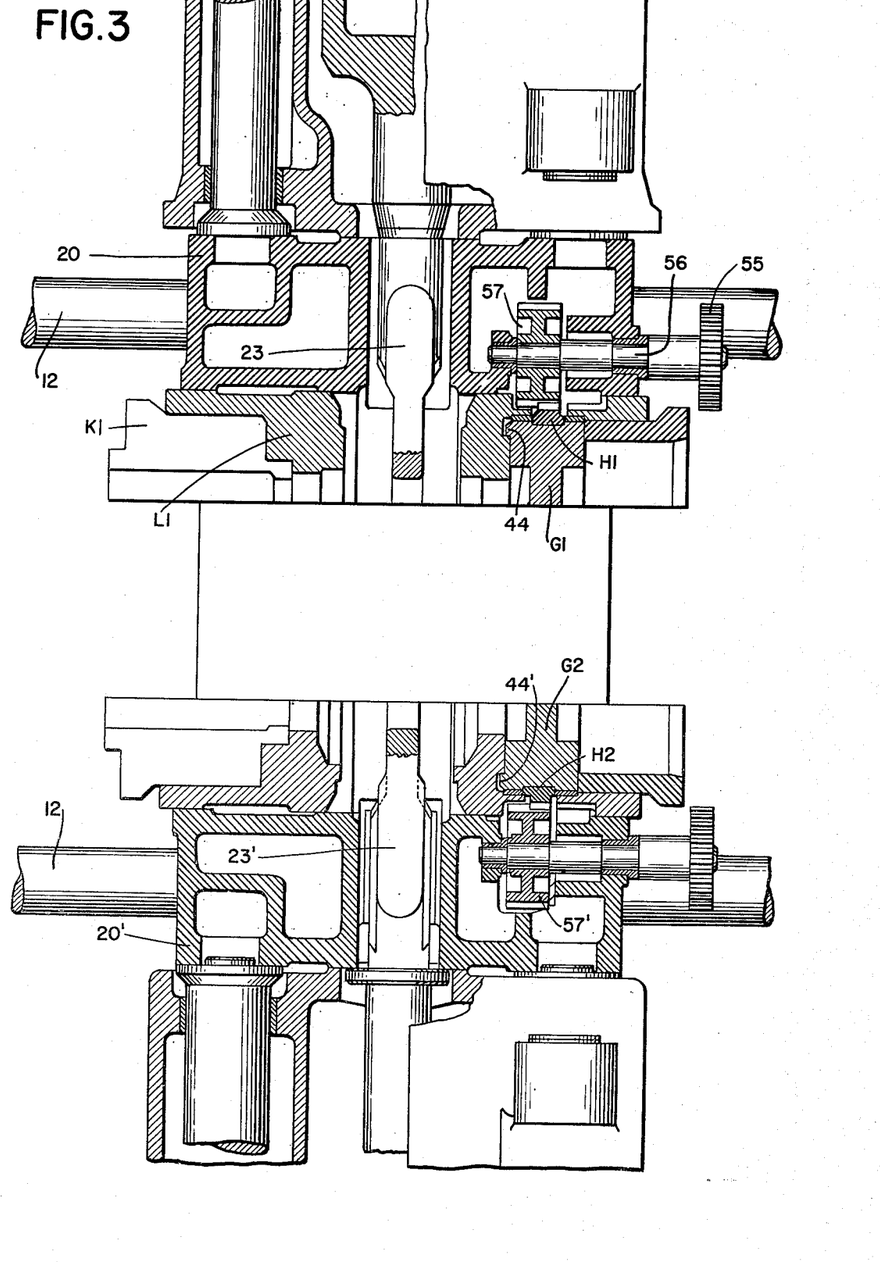
Fig. 3 is an enlarged, partial section of the offsetting press of Fig. 1, taken substantially on line 3—3 of Fig. 5 and including dies as shown in Fig. 11.
Figure 4:
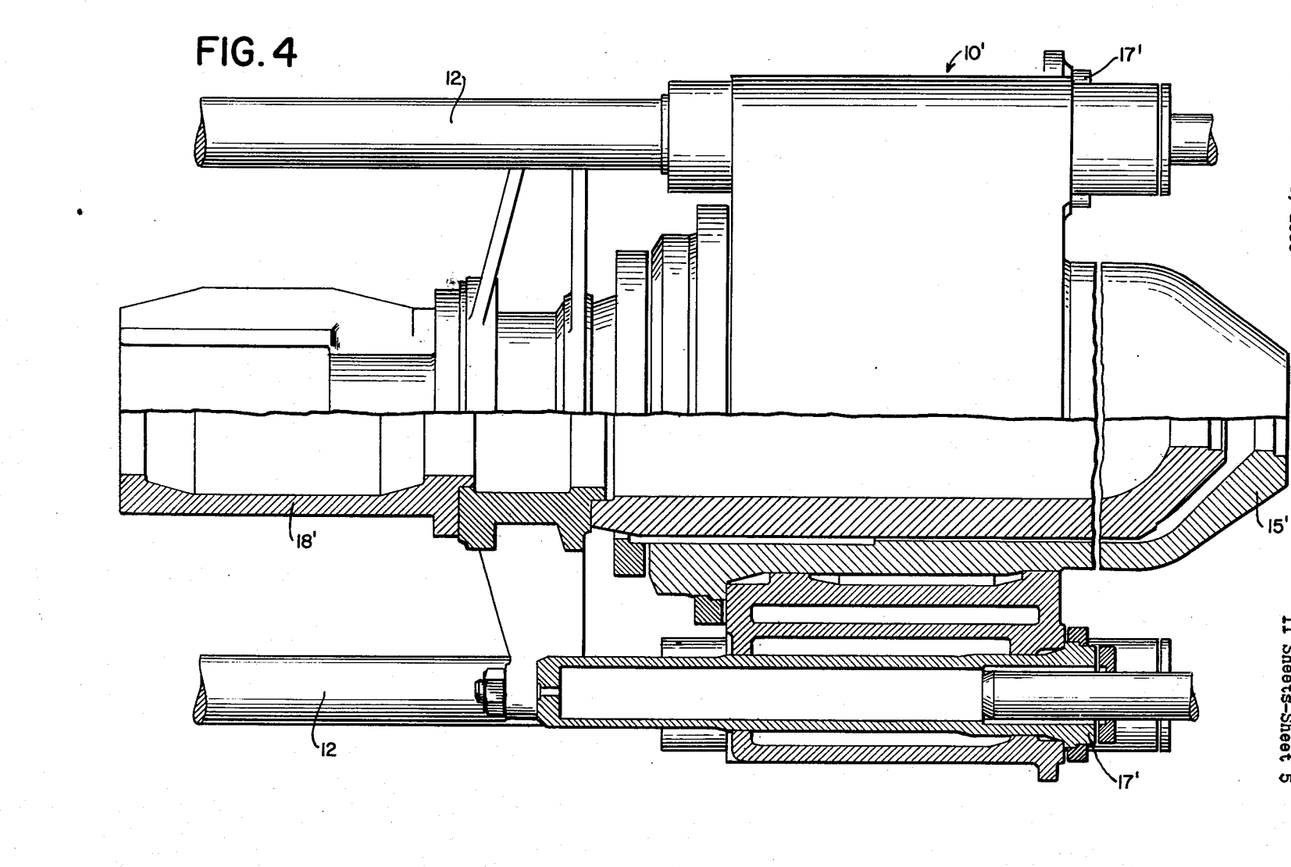
Fig. 4 is a view similar to Fig. 2 but showing the right hand upsetting press of Fig. 1.

To turn gear segments H1, H2 and maintain synchronism thereof in their open position, a motor 50 (Fig. 5) is mounted on the C-shaped frame 25 and connected through a set of bevel gears 51 to shafts 52, 52'. Shaft 52 has a spline connection with a bevel gear 53 slidable thereon for axial movement with crosshead 20. A bevel gear, spur gears and a chain drive, generally indicated at 54, are mounted on crosshead 20 to connect bevel gear 53 operatively with a pair of gears 55, each of which is arranged on a shaft 56 (Fig. 3). The shafts 56 drive a pair of pinions 57 (Fig. 16), that is, an upper pinion and a lower pinion, which are both in mesh with gear segment H1. In a corresponding manner, splined shaft 52' is operatively connected with a pair of pinions 57' in mesh with gear segment H2. The pinions of each pair are spaced so that at least one of the pinions will be in mesh with the respective gear segment H1, H2 in any angular position of the latter. It will be clear that with the mechanism described, die halves G1, G2 may be turned so that their angular position corresponds precisely to the predetermined angle between the first crank and the second crank.

Split die halves F1 and F2 are inserted into the receiving die halves E1 and E2. Dies F1 and F2 are used as spacers to accommodate the flanged portion 38, 39, 40, as well as to transmit the upsetting force required for further crank forming operations from ram 18' through holding dies G1 and G2 onto dies E1 and E2.

The spindle 30 is advanced by actuating motor-driven gear 31 to determine the position of the bar stock for forming the second crank.

When loading the bar stock into the machine again, the stock is turned so that the angular position of crank No. 1 corresponds substantially to that of the crank-shaped cavity of dies G1, G2. Crossheads 20, 20' and rams 23, 23' are then closed, dies G1, G2 accommodating and exactly positioning crank No. 1. All dies are subjected to operating pressure, and crank No. 2 is formed in the same manner as crank No. 1 (see Fig. 12).

Forming all subsequent cranks

Each crank as formed will be placed in dies G1, G2. If the angle between succeeding cranks remains the same, it is not necessary to turn the dies before the forged crank is placed therein. Thus, if the angle between cranks Nos. 1 and 2 is equal to the angle between cranks Nos. 2 and 3, the dies will receive crank No. 2 in the same angular position in which they accommodated crank No. 1. However, in case two succeeding cranks such as cranks Nos. 3 and 4 are positioned side by side in the same plane, dies G1, G2 will after formation of crank No. 3 be turned so that their crank-shaped die cavity is adjacent and parallel to ram 23', that is, the angle between the cavity of the holding die and ram 23' is zero. When crank No. 3 is secured in the holding die in this position, crank No. 4 will be forged adjacent and parallel to crank No. 3. It wil be clear that the angle between the cranks to be forged may readily be varied by turning dies G1, G2.

Upsetting and offsetting are performed each time in the manner described in connection with crank No. 1. The forming of the individual cranks is thus carried out in each case with the axis of the new crank being disposed in the same plane, that is, the horizontal plane through the axes of rams 23, 23'. The locating spindle for the bar stock is advanced each time for the succeeding step. Reheating may take place when required, for example, after forging two cranks in succession.

Forming last crank, collar and test piece

Split dies K1 and K2 are removed. Circular dies M and N are assembled to fit on the forward end of ram 18 (see Fig. 13). Split holding dies G1 and G2 (which now hold next to last crank) are in proper angular position relative to last crank No. 6 to be formed. The last crank is forged in the same manner as cranks Nos. 1 to 5.

Pressure on rams 18, 18' is relieved and ram 18 withdrawn while pressure is maintained on crossheads 20, 20'. Circular die M is removed (see Fig. 14). Ram 18 is advanced and both rams 18, 18' are then subjected to operating pressure. The collar 60 and test piece 61 are thus formed between dies L1, L2 and die N.

Instead of finishing one crankshaft at a time in consecutive operations as described hereinbefore, crank No. 1 and the flanged portion 38, 39, 40 may be forged on all crankshafts of a batch in succession, then the dies may be adjusted for forging cranks No. 2 and No. 3 on all shafts of the batch, and so forth until all crankshafts are completed.

Wherever the expression "crankshaft" is used in the description and appended claims, it is to be understood as including similar forged articles having upset and offset portions.

Having described my invention, what I claim and desire to secure by Letters Patent is:

1. A crankshaft forging machine for forging from straight bar stock a crankshaft having a plurality of journal portions and cranks at predetermined angles relative to each other, comprising actuating means operating axially for performing an upsetting operation on the straight bar stock to form the journal portions, actuating means operating transversely for substantially simultaneously performing an offsetting operation on the bar stock to form the cranks, dies into which upset and offset material of the bar stock is pressed to form a crank, means independent of the cranks for determining the longitudinal position of the stock relative to the next crank to be formed, the entire crank shaft and stock being adapted to be rotated about its axis to move the previously forged crank through a predetermined angle, whereby the shaft is in position for forging said next crank, and a set of workholder dies mounted for rotation through said predetermined angle, said last-named dies being adapted to lock said previously forged crank in rotated position.

2. A crankshaft forging machine as specified in claim 1, in which said set of dies adapted to be rotated comprises two die members movable relative to each other to open and closed positions, driving means being provided for rotating said die members in synchronism in their open position.

3. A crankshaft forging machine for forging from straight bar stock a crankshaft having a crank, and a flanged terminal portion including a plurality of connected elements, said machine comprising actuating means operating axially for performing an upsetting operation on the bar stock, actuating means operating transversely for substantially simultaneously performing an offsetting operation on the bar stock, a first set of dies conforming substantially to the finished contour of said crank, said dies being adapted to be filled in a single operation by upset and offset bar stock material, and a second set of dies cooperating with said first set and including a plurality of removable spacer members, the dies of said second set being successively rendered effective by selective removal of spacer members therefrom to form said connected elements in succession while said crank is held in said first set of dies.

4. A crankshaft forging machine for forging from straight bar stock a crankshaft having a crank and a flange adjacent one end of the bar stock, and a collar adjacent the other end of the stock, comprising actuating means operating axially for performing an upsetting operation on the bar stock, actuating means operating transversely for substantially simultaneously performing an offsetting operation on the bar stock, a first set of dies conforming substantially to the finished contour of said crank, said dies being adapted to be filled in a single operation by upset and offset bar stock material, a second set of dies cooperating with said first set and arranged for forming said flange while said crank is held in said first set of dies, and a third set of dies cooperating with said first set and including removable spacer means, the dies of said third set being rendered effective by removal of said spacer means therefrom to form said collar therein.

5. In a crankshaft forging machine for forming from straight elongated bar stock a crankshaft having a plurality of forged cranks, actuating means movable longitudinally of said stock through a predetermined working stroke, pusher means operated by said actuating means for applying upsetting pressure to one end face of the bar stock while the other end of the same is supported thus permitting said pusher means to cooperate in urging in a sufficient length of said bar stock to fill die cavities for crankshaft portions during the forming thereof, a plurality of die members mounted on said actuating means for applying additional upsetting pressure to the bar stock in a region intermediate the ends thereof, offsetting mechanism reciprocable transversely of the bar stock to offset the stock in said region for forming one of said cranks in conjunction with said pusher means and said die members, and return means effectively connected to the die members for withdrawing said members upon the formation of one of said cranks.

References Cited in the file of this patent

UNITED STATES PATENTS

| | | |
|---|---|---|
| 510,103 | Thomas et al. | Dec. 5, 1893 |
| 760,220 | Loss | May 17, 1904 |
| 1,392,328 | Cook | Oct. 4, 1921 |
| 1,403,696 | Larcher | Jan. 17, 1922 |
| 1,956,110 | Turrettini | Apr. 24, 1934 |
| 2,042,123 | Pierle | May 26, 1936 |
| 2,142,805 | Ryder | Jan. 3, 1939 |
| 2,535,295 | Lafont | Dec. 26, 1950 |
| 2,662,267 | Nelson | Dec. 15, 1953 |
| 2,743,500 | Berg | May 1, 1956 |
| 2,747,253 | Conchon | May 29, 1956 |

FOREIGN PATENTS

| | | |
|---|---|---|
| 700,956 | Great Britain | Dec. 16, 1953 |